US012571948B2

(12) United States Patent
Miragliotta et al.

(10) Patent No.: US 12,571,948 B2
(45) Date of Patent: Mar. 10, 2026

(54) THERMALLY ADAPTIVE COATINGS FOR EFFICIENT HEATING AND COOLING APPLICATIONS

(71) Applicant: The Johns Hopkins University, Baltimore, MD (US)

(72) Inventors: Joseph A. Miragliotta, Ellicott City, MD (US); David B. Shrekenhamer, Bethesda, MD (US); Andrew C. Strikwerda, Cambridge, MA (US); Gabriella M. Hunt, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 631 days.

(21) Appl. No.: 18/049,857

(22) Filed: Oct. 26, 2022

(65) Prior Publication Data

US 2023/0126472 A1 Apr. 27, 2023

Related U.S. Application Data

(60) Provisional application No. 63/271,864, filed on Oct. 26, 2021.

(51) Int. Cl.
| | |
|---|---|
| *B32B 15/04* | (2006.01) |
| *B32B 17/06* | (2006.01) |
| *G02B 5/20* | (2006.01) |

(52) U.S. Cl.
CPC .................................... *G02B 5/208* (2013.01)

(58) Field of Classification Search
CPC ...................................................... G02B 5/208
USPC ........................................................... 428/426
See application file for complete search history.

(56) References Cited

U.S. PATENT DOCUMENTS

| | | | | |
|---|---|---|---|---|
| 2013/0194652 A1* | 8/2013 | Choi | ..................... | G02F 1/0147 |
| | | | | 359/288 |
| 2014/0238013 A1* | 8/2014 | Wu | ........................ | F03G 7/0613 |
| | | | | 60/528 |
| 2018/0334269 A1* | 11/2018 | Yoshimoto | .............. | F28F 21/00 |
| 2019/0243036 A1* | 8/2019 | Marcel | ..................... | C09K 9/00 |
| 2023/0033524 A1* | 2/2023 | Wu | ..................... | C03C 17/3417 |
| 2023/0324228 A1* | 10/2023 | Wu | ........................ | G01J 5/046 |
| | | | | 374/121 |

(Continued)

OTHER PUBLICATIONS

Ruijve et al., "Amplification of future energy demand growth due to climate change," Nature Comm. 10 (2019) 2762.

(Continued)

*Primary Examiner* — Lauren R Colgan
(74) *Attorney, Agent, or Firm* — Todd R. Farnsworth

(57) ABSTRACT

A composite and an adaptive coating are provided. The composite includes a first layer, a second layer disposed on the first layer, and a third layer disposed on the second layer. The third layer constitutes a phase change material characterized by a transition temperature. The phase change material includes a dopant. The adaptive coating includes a visible light filter and the phase change material. When a temperature of the phase change material exceeds a threshold temperature, the adaptive coating is configured to radiate light in the infrared spectrum. When the temperature of the phase change material is less than the threshold temperature, the adaptive coating is configured not to radiate light in the infrared spectrum.

20 Claims, 6 Drawing Sheets

(56) References Cited

U.S. PATENT DOCUMENTS

OTHER PUBLICATIONS

Ono et al., "Self-adaptive radiative cooling based on phase change materials," Optics Express 26 (2018) A777.

Li et al., "Nanophotonic control of thermal radiation for energy applications [Invited]," Opt. Express 26 (2018) 15995.

Hossain et al., "Radiative Cooling: Principles, Progress, and Potentials," Adv. Science 3 (2016) 1500360.

Hossain et al., "A Metamaterial Emitter for Highly Efficient Radiative Cooling," Adv. Optical Materials 3 (2015) 1047-1051.

ARPA-E, SRI International, "Radiative Film for Supplemental Cooling," (2015) available at: https://arpa-e.energy.gov/technologies/projects/radiative-film-supplemental-cooling-0, last accessed Oct. 26, 2022.

ARPA-E, Palo Alto Research Center (PARC), "Radiative Film for Supplemental Cooling," (2015) available at: https://arpa-e.energy.gov/technologies/projects/radiative-film-supplemental-cooling, last accessed Oct. 26, 2022.

US Army, "Mountain Warfare and Cold Weather Operations Leader's Book," Apr. 16, 2020, available at: https://api.army.mil/e2/c/downloads/2021/06/28/7cb663ad/20-14.pdf, last accessed Oct. 26, 2022.

US Energy Information Administration, US Department of Energy, "Annual Energy Outlook 2020," Jan. 2020, available at: https://www.eia.gov/outlooks/archive/aeo20/pdf/AEO2020%20Full%20Report.pdf, last accessed Oct. 26, 2022.

Spence et al., "Engaging with energy reduction: Does a climate change frame have the potential for achieving broader sustainable behaviour?," / Journal of Environmental Psychology 38 (2014) 17-28.

Kandasamy, et al., "Application of phase change materials in thermal management of electronics," Applied Thermal Engineering 27 (2007) 2822-2832.

Zhang et al., "Cooling Energy Consumption Investigation of Data Center IT Room with Vertical Placed Server," Energy Procedia 105 ( 2017 ) 2047-2052.

Al-Obaidi, et al., "Passive cooling techniques through reflective and radiative roofs in tropical houses in Southeast Asia: a literature review," Frontiers of Architectural Research (2014) 3, 283-297.

Toe, et al., "Comparative assessment of vernacular passive cooling techniques for improving indoor thermal comfort of modern terraced houses in hot-humid climate of Malaysia," Solar Energy 114 (2015) 229-258.

Jones, "The Information Factories," Nature 561, 163-166 (2018).

Khan, et al., "On the winter overcooling penalty of super cool photonic materials in cities," Solar Energy Advances 1 (2021) 100009.

Chen et al., "Tuning the Doping Ratio and Phase Transition Temperature of VO2 Thin Film by Dual-Target Co-Sputtering," Nanomaterials 9 (2019) 834, 9 pages.

Nishikawa, et al., "Temperature-selective emitter," Appl. Phys. Lett. 114, 211104 (2019).

Huang, et al., "Infrared characteristics of VO2 thin films for smart window and laser protection applications," Appl. Phys. Lett. 101, 191905 (2012).

Nakano, "Infrared-sensitive electrochromic device based on VO2," Appl. Phys. Lett. 103, 153503 (2013).

Kats et al., "Ultra-thin perfect absorber employing a tunable phase change material," Appl. Phys. Lett. 101, 221101 (2012).

Tang et al., "Temperature-adaptive radiative coating for all-season household thermal regulation," Science 374, 1504-1509 (2021).

Muraoka et al., "Large modification of the metal-insulator transition temperature in strained VO2 films grown on TiO2 substrates," Journal of Physics and Chemistry of Solids 63 (2002) 965-967.

Kim et al., "Pulsed laser deposition of VO2 thin films," Appl. Phys. Lett. 65, 3188 (1994).

Miller et al., "Influence of grain size on transition temperature of thermochromic VO2," J. Appl. Phys. 117, 034307 (2015).

Wang et al., "Facile synthesis of VO2 (D) and its transformation to VO2(M) with enhanced thermochromic properties for smart windows," Ceramics International 46 (2020) 14739-14746.

Ji et al., "Al-doped VO2 films as smart window coatings: Reduced phase transition temperature and improved thermochromic performance," Solar Energy Materials and Solar Cells 176 (2018) 174-180.

Cheng et al., "Synthesis, structure and properties of printable W-doped thermochromic VO2 with a low phase transition temperature," Ceramics International 44 (2018) 20084-20092.

Romanyuk et al., "Temperature-induced metal-semiconductor transition in W-doped VO2 films studied by photoelectron spectroscopy," Solar Energy Materials & Solar Cells 91 (2007) 1831-1835.

Soltani et al., "Effects of codoping on the optical and electrical switching of vanadium dioxide thin films grown by a reactive pulsed laser deposition," Appl. Phys. Lett. 85, 1958 (2004).

Hajiaoui et al., "Metal-insulator transition temperature of boron-doped VO2 thin films grown by reactive pulsed laser deposition," Scripta Materialia 177 (2020) 32-37.

Huang et al., "Improvement of phase transition properties of magnetron sputtered W-doped VO2 films by post-annealing approach," Journal of Materials Science: Materials in Electronics (2020) 31:4150-4160.

Kats et al., "Optical absorbers based on strong interference in ultra-thin films," Laser Photonics Rev. 10, No. 5, 735-749 (2016).

Zhang et al., "Understanding of metal-insulator transition in VO2 based on experimental and theoretical investigations of magnetic features," Scientific Reports (2018) 8:17093, 7 pages.

Tan et al., "Unraveling Metal-insulator Transition Mechanism of VO2 Triggered by Tungsten Doping," Scientific Reports (2012) 2:466, 6 pages.

Karaoglan-Bebek, "Continuous tuning of W-doped VO2 optical properties for terahertz analog applications," Appl. Phys. Lett. 105, 201902 (2014).

Eia | U.S. Energy Information Administration, Frequently Asked Questions (FAQS), available at: www.eia.gov/tools/faqs/faq.php?id=86&t=1; last accessed Nov. 17, 2022.

Eia | U.S. Energy Information Administration, Electricity explained Use of electricity, available at: www.eia.gov/energyexplained/electricity/use-of-electricity.php; last accessed Nov. 17, 2022.

Sarah Kuta, This Ultra-White Paint May Someday Replace Air Conditioning, Smithsonian Magazine, Apr. 21, 2021, available at: https://getpocket.com/explore/item/this-ultra-white-paint-may-someday-replace-air-conditioning.

* cited by examiner

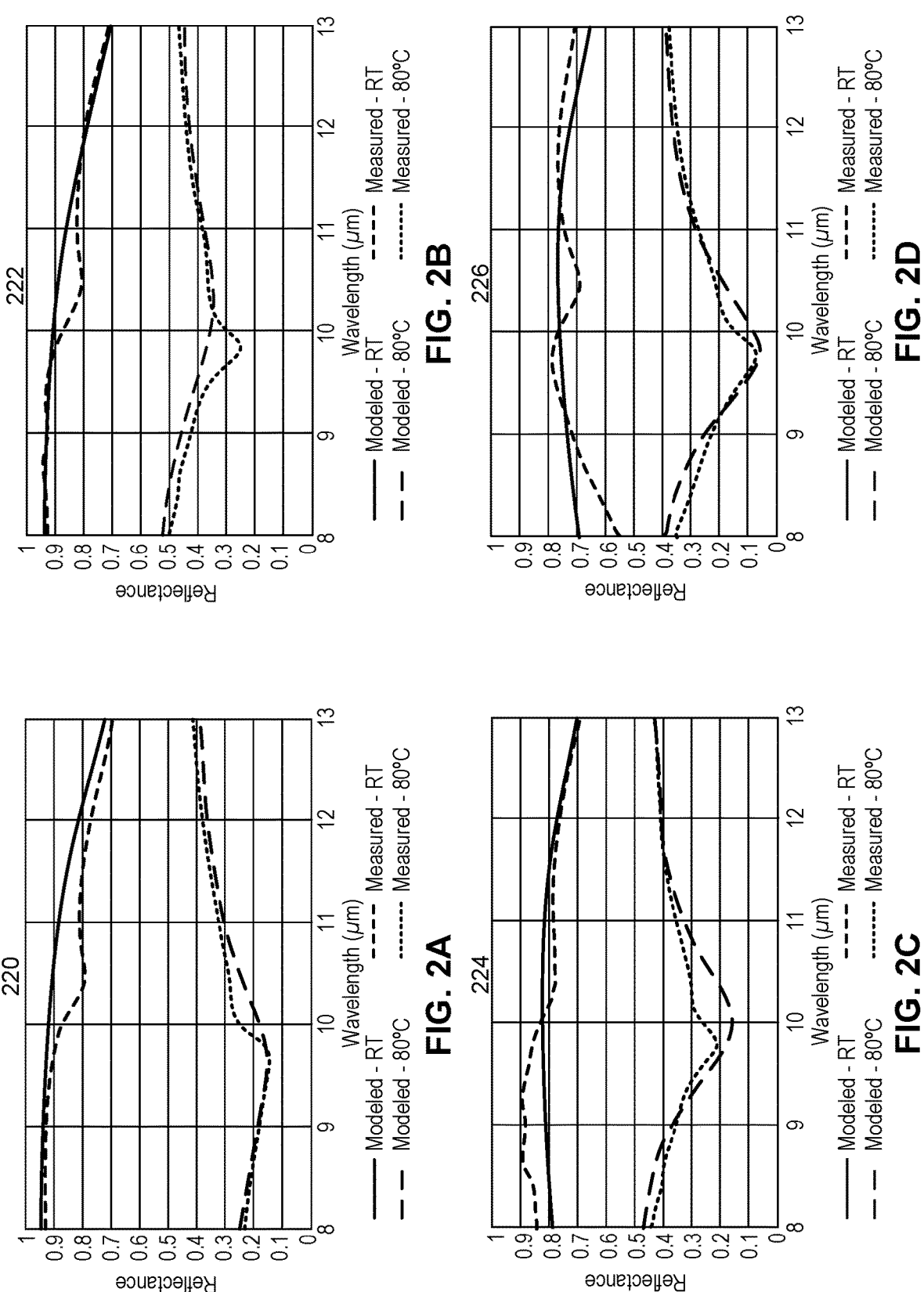

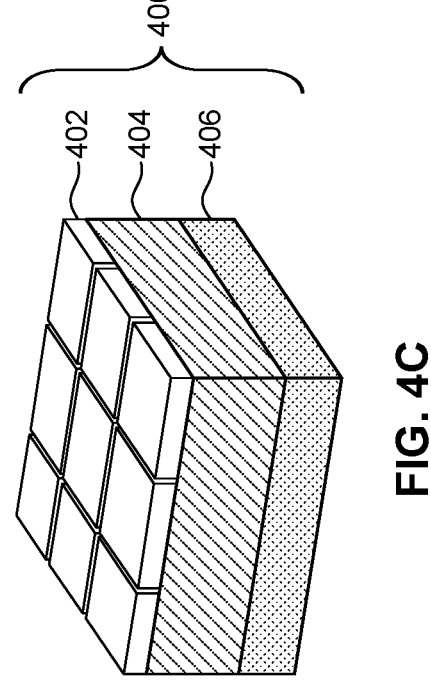
FIG. 4C
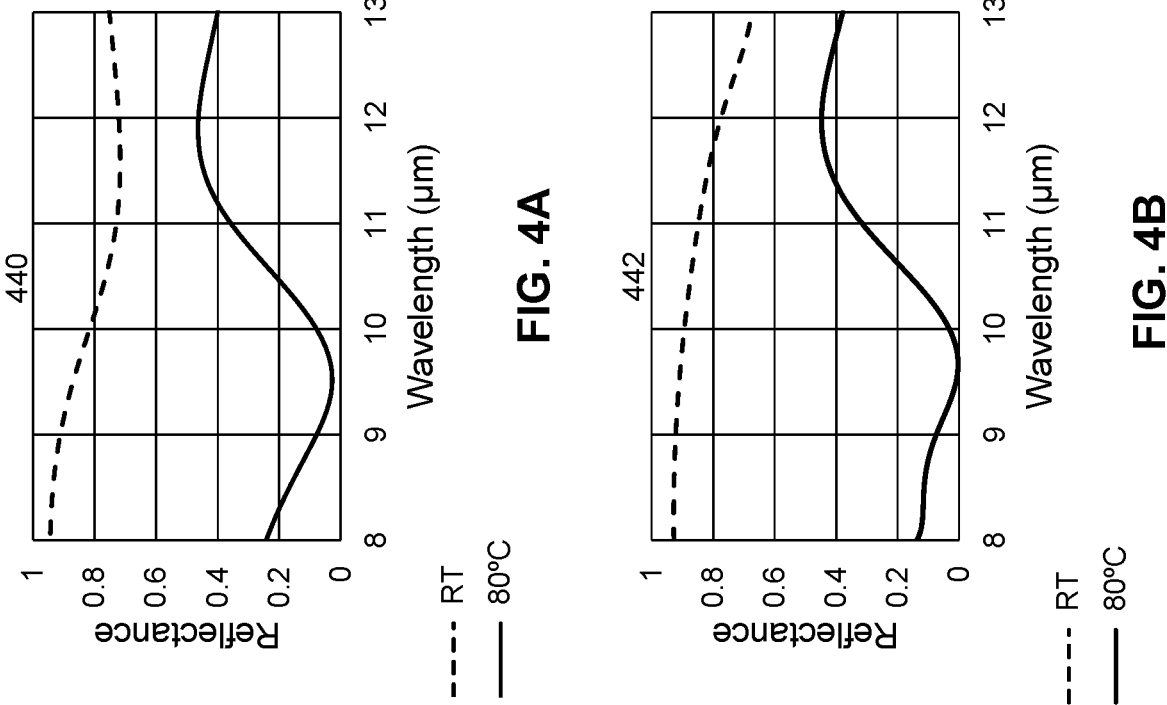
FIG. 4A
FIG. 4B

<u>500</u>

THERMALLY ADAPTIVE COATINGS FOR EFFICIENT HEATING AND COOLING APPLICATIONS

CROSS REFERENCE TO RELATED APPLICATIONS

This application claims the benefit of U.S. Provisional Application No. 63/271,864, filed Oct. 26, 2021, the contents of which are incorporated by reference herein in its entirety.

BACKGROUND

Field

The present disclosure relates to a composite used in an adaptive coating to provide passive thermal management of, for example, buildings and vehicles.

Background

Hundreds of billions of dollars are spent each year on energy associated with the cooling and heating of buildings, vehicles, and critical electronic systems. While these costs are expected to dramatically increase in coming years, such increasing energy costs are also expected to adversely impact atmospheric carbon and global temperatures. More specifically, most energy resources, including electricity, are generated by burning fossil fuels, and a by-product of the consumption of fossil fuels is the release of $CO_2$, which is closely related to global climate change. For this reason, a central focus in addressing climate change and reducing $CO_2$ emissions has been on efforts to transition to clean and renewable energy sources. Nonetheless, meeting climate change targets also requires reducing total energy consumption by creating more efficient thermal regulation systems.

Conventional thermal regulation systems are generally divided into two categories: passive and active. An active system, such as a common household HVAC unit, has significant functionality and can regulate temperature quickly. However, such an active system also requires an external energy input to operate effectively. In contrast to an active system, a passive system can regulate temperature without consuming extra energy to operate. As a result, efficient passive thermal management systems could assist in the reduction of the energy consumption associated with heating and cooling requirements across industries.

Existing passive thermal regulation systems may not be effective at inhibiting cooling below a certain temperature. Some passive thermal regulation systems used in residential or technology industries, such as radiative roofs or thermal barrier coatings, operate in one mode and continue operating even well beyond their desired temperature range. For example, in a cold weather setting where average temperatures can be well below freezing, radiative cooling from conventional passive thermal regulation systems will continue to decrease the operating temperature even below these already uncomfortable values.

SUMMARY

Therefore, there exists a need for a thermal management system that is both passive yet dynamic and highly efficient. Such a dynamic passive thermal management system could significantly reduce future energy needs and thus our reliance on fossil fuels for numerous thermal regulation applications within the residential, space, and technology industries.

In some embodiments, a dynamic passive thermal management system capable of switching on and off a passive cooling operation is discussed. The present inventors recognized that such a dynamic passive thermal management system could be realized by an adaptive coating that cools a structure (e.g., a building, vehicle, clothing, etc.) when exposed to high temperatures yet becomes thermally insulating at lower temperatures.

In some embodiments, an adaptive coating can include a first layer including a phase change material and a second layer including a visible light filter. In response to a temperature of the phase change material being greater than a threshold temperature, the adaptive coating can emit or "radiate" light in the infrared spectrum. In response to the temperature of the phase change material being less than the threshold temperature, the adaptive coating does not radiate light in the infrared spectrum.

In some embodiments, a composite includes a first layer, a second layer disposed on the first layer, and a third layer disposed on the second layer. The third layer can be a phase change material characterized by a transition temperature. The phase change material can include a dopant.

According to some embodiments, a method for maintaining the temperature of an environment includes coating at least one surface of a structure defining the environment with an adaptive coating. The adaptive coating can include at least a phase change material characterized by a transition temperature. In response to a temperature of the phase change material being greater than a threshold temperature, the adaptive coating can radiate light in the infrared spectrum. In response to the temperature of the phase change material being less than the threshold temperature, the adaptive coating does not radiate light in the infrared spectrum.

According to some embodiments, a method for manufacturing a composite may include providing a second layer on a first layer and depositing a third layer on the second layer. The third layer may be, for example, a phase change material characterized by a transition temperature and may include a dopant.

According to some embodiments, a method for maintaining the temperature of an environment may include, for example, coating at least one surface of a structure defining the environment with an adaptive coating, where the adaptive coating includes at least a phase change material characterized by a transition temperature, in response to a temperature of the phase change material being greater than a threshold temperature, the adaptive coating may be configured to radiate light in the infrared spectrum, and in response to the temperature of the phase change material being less than the threshold temperature, the adaptive coating may be configured not to radiate light in the infrared spectrum.

Additional features of the present disclosure, as well as the structure and operation of various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present disclosure and, together with this written description, further serve to explain the principles of the present disclosure and to enable a person skilled in the relevant art(s) to make and use embodiments described herein.

FIGS. 2A, 2B, 2C, and 2D are graphs of modeled and measured reflectivity both above and below a transition point for respective samples, according to some embodiments.

Figure 3A:
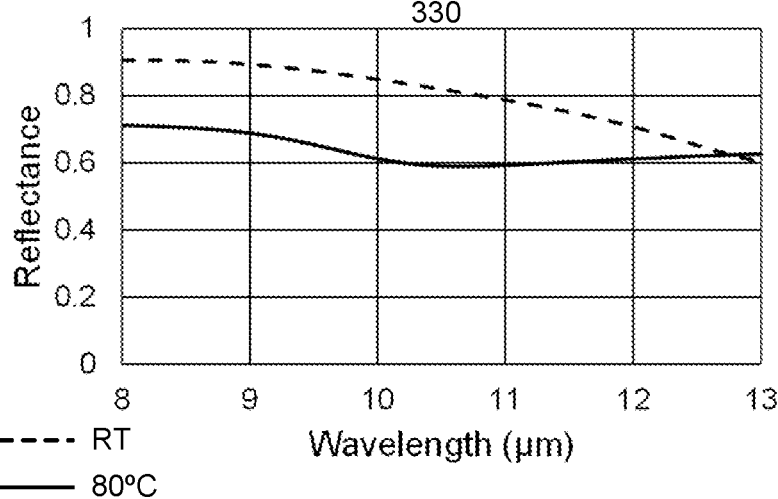
Figure 3B:
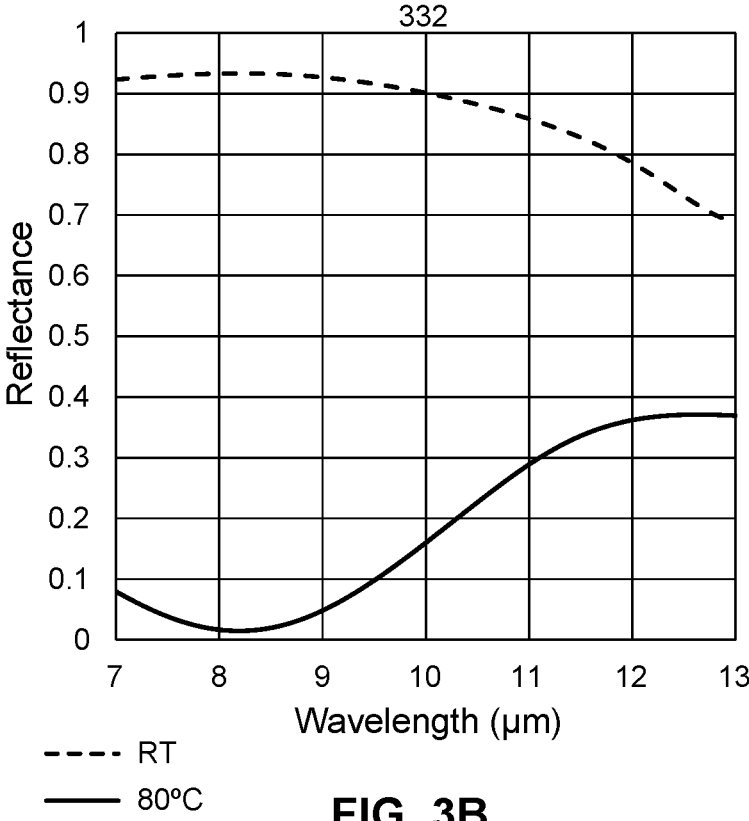
Figure 3C:
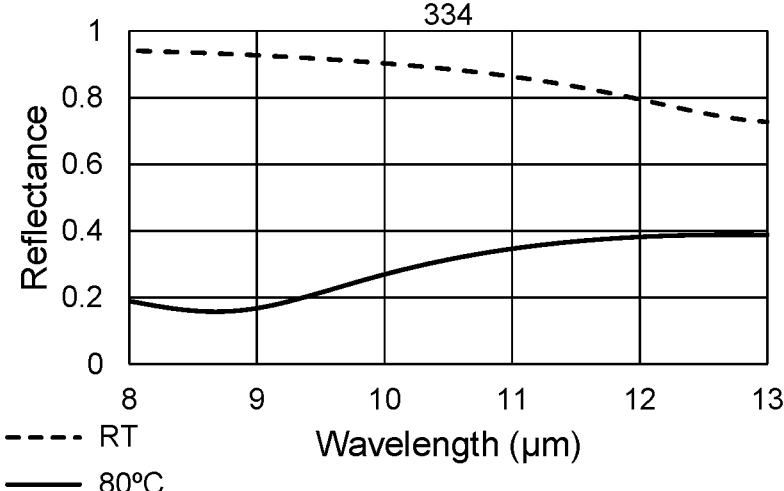

FIGS. 3A, 3B, and 3C are graphs of modeled reflectivity both above and below a transition point for samples having differing third layer thicknesses, according to some embodiments.

FIGS. 4A and 4B are graphs of modeled reflectivity both above and below a transition point for samples having differing configurations of patterned resonators, according to some embodiments.

FIG. 4C is a schematic illustration of a patterned composite, according to some embodiments.

Figure 5:
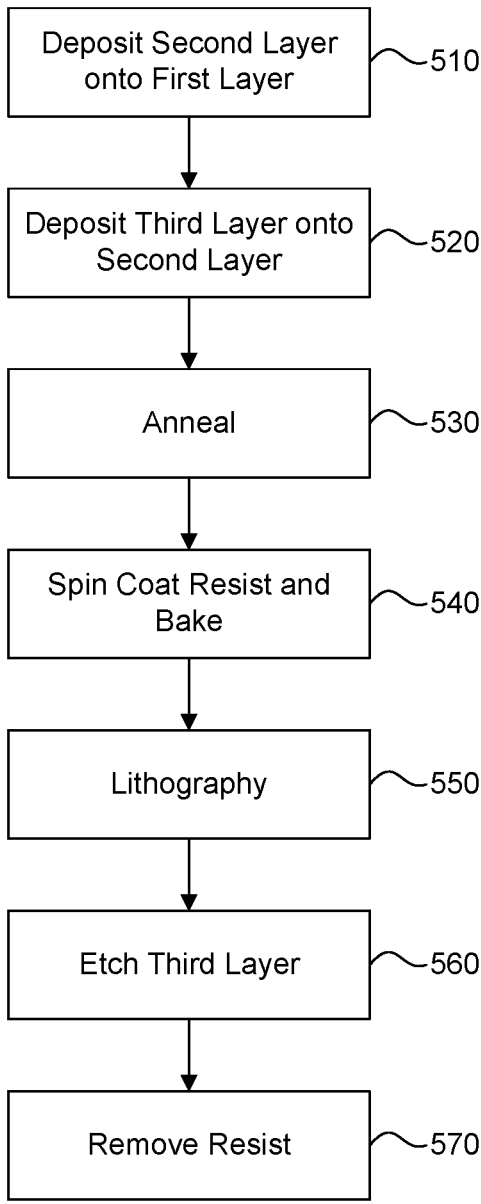

FIG. 5 is a flowchart illustrating a method of manufacturing a patterned composite, according to some embodiments.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of the present disclosure. The disclosed embodiment(s) are provided as examples. The scope of the present disclosure is not limited to the disclosed embodiment(s). Claimed features are defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terms "substantially," "about," "approximately," or the like may be used herein to indicate a value of a quantity that may vary or be found to be within a range of values, based on a particular technology. Based on the particular technology, the terms may indicate a value of a given quantity that is within, for example, 1-20% of the value (e.g., ±1%, ±5%±10%, ±15%, or ±20% of the value).

Figure 1B:
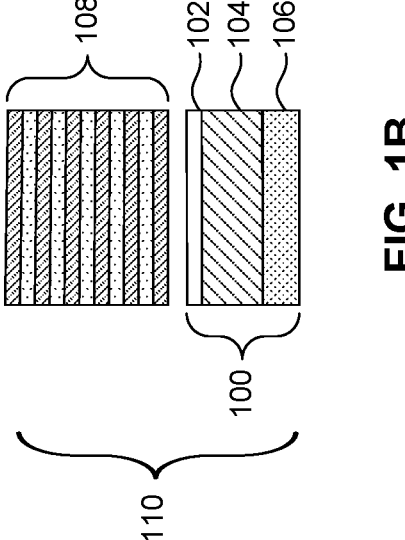
FIG. 1B illustrates an adaptive coating including a composite and a visible light filter, according to some embodiments.
Figure 1A:
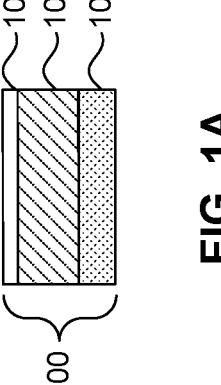
FIG. 1A is a schematic representation of a composite, according to some embodiments.

FIG. 1A illustrates a composite, according to some embodiments. For example, composite 100 can include a first layer 106, a second layer 104 disposed on first layer 106, and a third layer 102 disposed on second layer 104.

In some embodiments, first layer 106 may be, for example, a ground plane or a substrate. In one embodiment, first layer 106 can have an optical reflectivity that is greater than 90%. In one embodiment, the first layer 106 may be transparent in longer wavelength IR with the reflectivity only in the solar spectrum. For example, first layer 106 may be a metallic film composed of one or more of aluminum, tungsten, copper, silver, gold, or similar reflective metals.

In some embodiments, second layer 104 is disposed on first layer 106. Second layer 104 may be, for example, a dielectric layer or a spacer layer. Second layer 104 is not limited in this way, but may be any material having suitable dielectric properties. As an example, second layer 104 may consist of one or more of alumina ($Al_2O_3$), magnesium fluoride ($MgF_2$), barium fluoride ($BaF_2$), $SiO_2$, $SiN_x$, $TiO_2$, Si, Ge, ZnS, $CaF_2$, ZnSe, or the like.

In some embodiments, the material for second layer 104 may be chosen to share one or more elements with first layer 106. As a non-limiting example, in some embodiments, first layer 106 may be aluminum and second layer 104 may be alumina.

In some embodiments, a material for second layer 104 may be chosen based on one or more physical properties. For example, a material for second layer 104 may be closely lattice-matched to first layer 106. In one aspect, a material for second layer 104 may be highly transparent in a desired range of wavelengths, for example, in the visible and/or long wave IR ranges of the electromagnetic spectrum.

In some embodiments third layer 102 is disposed on second layer 104. Third layer 102 may preferably be a phase change material (PCM) characterized by having a transition temperature $T_H$. In some aspects, the transition temperature $T_H$ of the PCM may be reversible, solid-state transition, and the PCM may demonstrate markedly different optical or electrical properties before the phase change and after the phase change. As examples, a desirable PCM may be a material that demonstrates a metal-insulator (MI or Mott) transition, a superconducting transition, a solid-state magnetic transition, or any material showing another solid-state or condensed matter transition exhibiting differing electrical and/or optical properties across the phase change.

A material for the PCM may be chosen to suitably correspond to a desired heating-to-cooling transition temperature of the adaptive coating. In some aspects, in residential and technology applications where a desired heating-to-cooling transition temperature may be in the range of approximately 0-100° C., a PCM may be chosen to have a transition temperature $T_H$ within this range. In some aspects, residential and technology applications may have a desired heating-to-cooling transition temperature in the range of approximately 60-100° F. One exemplary PCM for such an application is discussed below.

For example, in some embodiments, the PCM of third layer 102 may constitute vanadium dioxide ($VO_2$). In some aspects, $VO_2$ demonstrates an ultrafast, reversible, solid-state metal-insulator MI transition at around 68° C. As a result of this phase change, $VO_2$ can undergo a transition from a low-temperature state that reflects light in the infra-red (IR) range to a high-temperature state that emits light in the IR range. This transition can make $VO_2$ a good example for use in an adaptive coating configured to be used in the range of approximately 0-100° C.

FIG. 1B illustrates an adaptive coating 110, according to some embodiments. For example, and as compared to FIG. 1A, adaptive coating 110 can include a visible light filter 108 and composite 100 as shown in FIG. 1A, where composite 100 can include first layer 106, second layer 104, and third layer 102.

In some embodiments, visible light filter 108 may be provided directly on top of third layer 102 or with a gap provided between the two layers. In some aspects, visible light filter 108 can filter out visible light from solar radiance incident on adaptive coating 110, while allowing emitted IR light from the underlying composite to transmit through and beyond the visible light filter. By this configuration, adaptive coating 110 is able to filter visible light out of the solar radiance incident on adaptive coating 110 while allowing IR light to transmit through composite 100.

In some embodiments, in the high-temperature absorptive state, adaptive coating 110 may provide a cooling function to an underlying structure. For example, in the high-temperature absorptive state, composite 100 may allow some IR light that is radiated by an underlying structure to pass through composite 100 and to be radiated away from the underlying structure. In some aspects, some IR light that is emitted by the underlying structure may be transmitted through third layer 102.

In some embodiments, when third layer 102 constitutes $VO_2$ in a low-temperature insulating state, composite 100 may provide an "insulating" function to the underlying structure. For example, composite 100 in the low-temperature state will limit the amount of radiated IR light from the structure.

Characterization of Films

In some embodiments, to demonstrate changes to optical properties before and after the phase change of the PCM, optical characteristics of the resulting composite may be modeled and measured. For example, the present inventors have modeled the optical characteristics of composites and have performed temperature-dependent reflectance mea-surements of optical characteristics of fabricated composites using FT-IR and normalizing with respect to a gold mirror. FIGS. 2A-2D illustrate graphs 220 to 226, according to some embodiments. For example, graphs 220 to 226 repre-sent the reflectance of samples shown in Table 1 (below). In graphs 220 to 226, the y-axis represents the measured or modeled reflectance (normalized to 1) as a function of the wavelength (in microns) of the IR light used for the mea-surement, which is represented by the x-axis. Graphs 220 to 226 show measured and modeled reflectance for both room temperature (RT) (e.g., 20-30° C.) and higher temperature (80° C.). In some aspects, the RT reflectance represents reflectance of a composite 100 in a low-temperature insu-lating state, and the 80° C. reflectance represents reflectance of a composite 100 in a high-temperature metallic state. Graphs 220 to 226 show that, for each sample, reflectance of composite 100, whether modeled or measured, decreases from the low-temperature insulating state to the high-tem-perature metallic state.

In some aspects, absorptance of each sample can be calculated using the following formula (1).

$$A(\lambda)=1-R(\lambda) \qquad [1]$$

In some aspects, in formula 1, $R(\lambda)$ represents the mod-eled or measured reflectance of the sample. In some aspects, due to the presence of the highly reflective first layer, the transmittance through the coating stack may be negligible and taken to be 0 for the purposes of determining the absorptance.

In some aspects, in characterizing the resulting compos-ites, an emissive contrast may be defined as the difference between the peak absorptance of the sample in the low temperature state and the minimum absorptance of the sample in the high temperature state. In some aspects, such an emissive contrast may also be a peak emissive contrast. Table 1 below shows the emissive contrast for each sample over the range of light having wavelengths of 8-13 microns (i.e., the long wave IR region) along with the respective sample.

In some embodiments, when third layer 102 constitutes $VO_2$ in a low-temperature insulating state, reducing the thickness of second layer 104 may maximize the IR reflec-tance of composite 100 by phonon-based absorption in the long wave IR region due to the dielectric characteristics of the material in second layer 104.

In some embodiments, when third layer 102 constitutes $VO_2$ in a high-temperature metallic state, increasing the thickness of second layer 104 while maintaining a thin third layer 102 enhances the IR absorptance of composite 100. For this reason, a combination of a sufficiently thick second layer 104 and an adequately thin third layer 102 may result in light confinement within second layer 104, thereby caus-ing field build up and absorption in third layer 102 at temperatures above the transition temperature $T_H$.

In some embodiments, performance of adaptive coating 110 utilizes a balance of the thickness of second layer 104 and the thickness of first layer 102 to maximize the reflec-tance in the low-temperature state without compromising absorptance in the high-temperature state.

In some embodiments, the transition temperature $T_H$ of the PCM and the emissive contrast of the resulting compos-ite can be adjusted by introducing a dopant into the PCM.

In some embodiments, patterning of the PCM to create discrete resonators can enhance the emissive contrast of the resulting composite and adaptive coating.

Doping

TABLE 1

Properties of Samples A-D

| Sample | First Layer Thickness | Second Layer Thickness | Third Layer Thickness | Measured Stoichiometry of Third Layer | Optical Transition Temperature | $\Delta T$ | Peak Emissive Contrast |
|---|---|---|---|---|---|---|---|
| A | 200 nm | 700 nm | 50 nm | $VO_2$ | 68° C. | 10° C. | 63% |
| B | 200 nm | 700 nm | 100 nm | $VO_2$ | 66° C. | 8° C. | 66% |
| C | 200 nm | 700 nm | 100 nm | $W_{0.011}V_{0.989}O_2$ | 44° C. | 16° C. | 64% |
| D | 200 nm | 700 nm | 100 nm | $W_{0.017}V_{0.983}O_2$ | 29° C. | 32° C. | 58% |

Table 1 above provides design and characteristic details for four samples A-D used to measure the impact of doping and layer thickness of the third layer on the emissive contrast of the resulting composite.

Graphs 220-226 in FIGS. 2A-2D further show good agreement between the modeled reflectance at each temperature and the measured reflectance at each temperature, for each sample, thereby establishing the reliability of modeled reflectance data. Data shown in graphs 220-226 of FIGS. 2A-2D can be used to determine the emissive contrast shown in Table 1 as described above.

In some aspects, the samples in Table 1 were each fabricated using Al for the first layer, $Al_2O_3$ for the second layer, and W-doped $VO_2$ ($W_xV_{1-x}O_2$) in the stoichiometry shown, for the third layer. The first layer and second layer were deposited using electron-beam evaporation.

In some embodiments, fabrication of the third layer utilizes sequential deposition and annealing processes. An example process will be described next. First, amorphous $VO_x$ films can be deposited at room temperature by reactive DC magnetron sputtering from a 2-inch, high purity, elemental V target. When depositing the $W_xV_{1-x}O_2$ films, V target can be co-sputtered with a V—W alloy target, so that W concentration can be controlled by adjusting the power applied to the alloy target. The primary gas constituent in the sputtering process can be argon (Ar) with a partial pressure of oxygen ($O_2$) to obtain amorphous $VO_x$ for which x can be nearly 2. After deposition, the samples can be annealed in a vacuum furnace maintained at 100 mTorr and 400° C. The desired oxide form of $VO_x$, where x is two (2), can be maintained by using a controlled flow of Ar—$O_2$ in the vacuum furnace. X-ray spectroscopy (XPS), Rutherford backscatter spectroscopy (RBS), and x-ray diffraction (XRD) can be used to correlate process parameters to resulting film thicknesses and stoichiometries. The forgoing description is merely illustrative of one particular embodiment and should not be understood as limiting the disclosure in any way.

Initially, samples B, C, and D in Table 1 show that increasing concentration of a dopant atom, in this embodiment W, leads to a decrease in the transition temperature $T_H$ of the resulting third layer film. In particular, a W concentration of 1.1% results in a decrease of the transition temperature $T_H$ of the PCM of over 20° C., while a W concentration of 1.7% results in a transition temperature $T_H$ of 29° C. (84° F.), which is within the desired range discussed above of 60-100° F. for residential and technology applications.

In some aspects, Table 1 further shows that the emissive contrast can remain high even for higher levels of W doping. In some aspects, this can allow for a PCM film, a resulting composite, and an adaptive coating having a transition temperature $T_H$ within a desired range for residential and technology applications while maintaining a high emissive contrast.

Third Layer Thickness

Embodiments discussed above demonstrate an adaptive coating capable of operating within a desired temperature while maintaining desirable optical characteristics. FIGS. 3A-3C illustrate graphs 330 to 334, according to some embodiments. For example, graphs 330 to 334 an show the effects of the thickness of a third layer on optical characteristics of a resulting composite structure. In graphs 330 to 334, the y-axis represents the modeled reflectance (normalized to 1) as a function of the wavelength (in microns) of the IR light used for the measurement, as represented by the x-axis. As above, the RT reflectance represents reflectance of a composite 100 in a low-temperature insulating state. The 80° C. reflectance represents reflectance of a composite 100 in a high-temperature metallic state.

Graphs 330-334 in FIGS. 3A-3C show respective modeled reflectance at both room temperature (RT) and at 80° C. across the long wave IR range of 8-13 μm for three composites. Each composite has a first layer of 200 nm of Al and a second layer of 700 nm of $Al_2O_3$. Graphs 330-334 in FIGS. 3A-3C differ in the thickness of a third layer of undoped $VO_2$: graph 330 in FIG. 3A represents a third layer thickness of 200 nm, graph 332 in FIG. 3B represents a third layer thickness of 100 nm, and graph 334 in FIG. 3C represents a third layer thickness of 50 nm.

Graphs 330-334 of FIGS. 3A-3C show that an emissive contrast of a resulting composite structure may be maximized for a third layer thickness between 50-100 nm. For example, the emissive contrast of the resulting composite increases from graph 330 in FIG. 3A, having a third layer 102 thickness of 200 nm, to graph 332 in FIG. 3B, having a third layer 102 thickness of 100 nm. The emissive contrast of the resulting composite remains high in graph 334 in FIG. 3C for a third layer 102 thickness of 50 nm. Thus, decreasing third layer 102 thickness from 200 nm to 100 nm or less results in increased emissive contrast of the resulting composite.

Third Layer Patterning

FIGS. 4A-4B illustrate graphs 440 and 442, according to some embodiments. For example, graphs 440 and 442 show the effects of patterning of the third layer on the optical characteristics of the resulting composites in accordance with some embodiments. In graphs 440 and 442, the y-axis represents the modeled reflectance (normalized to 1) as a function of the wavelength (in microns) of the IR light used for the measurement, as represented by the x-axis. As above, the RT reflectance represents reflectance of a resulting composite in a low-temperature insulating state, and the 80° C. reflectance represents reflectance of a resulting composite in a high-temperature metallic state.

FIG. 4C shows a composite structure 400, according to some embodiments. For example, composite structure 400 can have a first layer 406, a second layer 404, and a third layer 402. Properties and elements of these layers may be substantially the same as in the embodiment shown in FIGS. 1A and 1B. In some aspects, portions of third layer 402 have been etched away so that remaining portions of third layer 402 are formed into discrete resonators. In some aspects, by this patterning of third layer 402 into such resonators, it is possible to tailor the dispersion of IR light in the resonators, thereby enhancing absorption of IR light in the high-temperature metallic state of the PCM.

Although FIG. 4C shows an embodiment in which third layer 402 is patterned to form a plurality of resonators each having the same width, other embodiments result in resonators having different widths. For example, the embodiment shown in FIG. 4B, as discussed below, results in two sets of resonators, each set of resonators having a different width from the other set of resonators. Other arrangements, resulting in additional sets of resonators having varying widths, are also contemplated by this disclosure.

In some aspects, FIGS. 4A and 4B show respective modeled reflectance at both room temperature (RT) and at 80° C. across the long wave IR range of 8-13 μm of composites resulting from the patterning of third layer 402.

FIG. 4A shows modeled reflectance for a sample according to one embodiment having a first layer 406 of 200 nm thick Al, a second layer 404 of 1 μm thick $Al_2O_3$, and a third layer 402 of 100 nm thick undoped $VO_2$. As an example, third layer 402 was patterned in this embodiment by etching to create a plurality of resonators. Each resonator has a feature size of 4.4 μm. The etching of third layer 402 forms a gap of 800 nm between adjacent resonators. Such patterning results in an increase in reflectance for the low-temperature phase of the resulting composite structure 400.

FIG. 4B shows modeled reflectance for a sample according to another embodiment having a first layer 406 of 200 nm thick Al, a second layer 404 of 1 μm thick $Al_2O_3$, and a third layer 402 of 100 nm thick undoped $VO_2$. In this embodiment, third layer 402 was patterned by etching to create two sets of alternating resonators configured in a pattern of alternating island-like patches, one set of first resonators each having a width of 4.4 μm, and one set of second resonators each having a width of 3.6 μm. A gap of 800 nm is formed between adjacent resonators, resulting in a periodicity of 11.2 μm. FIG. 4B shows a decrease in reflectance for the high-temperature phase of composite 400 over the 8-10 μm spectral range within the IR spectrum. Accordingly, such dual resonator patterning provides a method to tune the emissive contrast of a composite over specific portions of the IR spectral range.

Method of Manufacture

FIG. 5 shows a method 500, according to some embodiments. For example, method 500 can be used for manufacturing a composite according to the embodiments shown above in FIGS. 1A to 1B and 4A-4C. It is to be appreciated, not all steps may be required in all applications, nor in the order shown.

At step 510, first and second layers are deposited on a substrate. In some aspects, the deposition technique used can depend on the materials chosen for the first layer and the second layer. For example, when the first layer is aluminum and the second layer is $Al_2O_3$, any known deposition technique may be used that results in satisfactory film thickness. In an embodiment, a first layer of aluminum may be disposed on a substrate by electron beam (E-beam) evaporation. Likewise, a second layer of $Al_2O_3$ may be disposed on the first layer using E-beam evaporation. In one embodiment, the first and second layers may be deposited by evaporating aluminum first in an inert environment to form the first layer, and then in an oxygen-containing environment to form the second layer.

In step 520, a third layer is deposited on the second layer. As in step 510, the method of deposition can depend on the materials used for the third layer. For example, when the third layer is W-doped $VO_2$, any known deposition technique may be used that results in satisfactory film thickness and stoichiometry. In one embodiment, a third layer of $W_xV_{1-x}O_2$ may be deposited by, for example, magnetron sputtering. In an embodiment, the present inventors found that co-sputtering using a V target and a W-doped V target allowed for more precise control of W concentration in the resulting composite.

In step 530, annealing can occur. For example, the as-grown composite may be annealed in an oxygen-containing environment to prevent oxygen loss during annealing. In one embodiment, the as-grown composite is annealed in a substantially argon atmosphere with a partial pressure of $O_2$.

In step 540, after the composite is deposited and annealed, resist may be formed on the composite. The resist may be any resist that coats the composite without reacting with the composite. Examples of such a resist include poly(meth)acrylates (PMMA), styrene acrylates, novolac-based polymers, and copolymers. In one embodiment, the resist may be a styrene acrylate-based E-beam resist. The resist is then developed by baking. In another embodiment, a spin coat resist may be formed prior to baking. In an example spin coating technique, a few ml of resist may be placed or dispensed on a substrate which is typically brought to a rotational speed of several 1000 rpm before (e.g., dynamic spin-coating) or shortly thereafter (e.g., static spin-coating). In this example, due to the centrifugal force, the dispensed resist spreads into a uniform resist film of desired film thickness, excess resist is spun off the edge of the substrate, and at the same time, a part of the solvent evaporates from the resist film, so that its thinning stopped on the one hand and on the other hand, the resist film becomes sufficiently stable to suppress its elapsing during the handling of the wafers after coating.

In step 550, the baked resist can be patterned by a microlithography process and residue can be cleaned away. The choice of microlithography process can depend on the type of resist used in step 540. For example, optical lithography, UV lithography, X-ray lithography, and E-beam lithography, or any similar lithography process may be used to pattern the resist. In the embodiment discussed above, E-beam lithography is used to pattern an E-beam resist without removing portions of the third layer. Further, xylene is used in the above-discussed embodiment to remove the residue of the E-beam lithography.

As discussed above regarding FIGS. 4A-4C, the third layer may be patterned to create a plurality of resonators. In one embodiment, the plurality of resonators may all be substantially the same size, having substantially the same width. In another embodiment, the third layer may be patterned to produce two or more sets of resonators, each set of resonators having a different width from the other set or sets of resonators.

In step 560, the third layer can be etched by an etching process to create the resonators in the third layer. The type of etching process can be selected for the compatibility of the etchant with the resist, the ability to etch the materials of the third layer, and any reactivity with the materials of the second layer. The etching process may use one or both of a wet etching and a dry etching. The etching process may be isotropic or anisotropic. In various embodiments, dry etching processes may include plasma etching and reactive ion etching. In one embodiment, the third layer is etched by reactive ion etching.

At step 570, any remaining resist can be removed from the composite. The resist may be removed using any method without damaging the third layer underneath. In one embodiment, the resist is removed using $O_2$ plasma etching.

It is to be understood that the phraseology or terminology herein is for the purpose of description and not of limitation, such that the terminology or phraseology of the present disclosure is to be interpreted by those skilled in relevant art(s) in light of the teachings herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While specific embodiments of the disclosure have been described above, it will be appreciated that embodiments of the present disclosure may be practiced otherwise than as described. The descriptions are intended to be illustrative, not limiting. Thus it will be apparent to one skilled in the art that modifications may be made to the disclosure as described without departing from the scope of the claims set out below.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein.

The breadth and scope of the protected subject matter should not be limited by any of the above-described exemplary embodiments, but should be defined only in accordance with the following claims and their equivalents.

What is claimed is:

1. A composite comprising:
a first layer;
a second layer disposed on the first layer; and
a third layer disposed on the second layer, wherein:
the third layer constitutes a phase change material characterized by a transition temperature,
the phase change material includes a dopant, and
the second layer comprises a material that is lattice-matched to a lattice of the first layer.

2. The composite of claim 1, wherein:
a thickness of the third layer is less than or equal to 100 nm.

3. The composite of claim 1, wherein:
the transition temperature of the phase change material is greater than or equal to 0° C. and less than or equal to 100° C.

4. The composite of claim 1, wherein:
the phase change material undergoes a reversible metal to insulator (MI) transition.

5. The composite of claim 1, wherein:
the phase change material is $VO_2$.

6. The composite of claim 5, wherein:
the dopant is W.

7. The composite of claim 1, wherein:
a concentration of the dopant in the phase change material is expressed as $A_xB_{1-x}$, where A is a dopant atom, B is an atom of the phase change material, and X is a concentration of the dopant, and
X is less than or equal to 0.02.

8. The composite of claim 1, wherein:
the phase change material has a chemical formula expressed as $W_xV_{1-x}O_2$, and
X is less than or equal to 0.02.

9. The composite of claim 1, wherein:
a thickness of the second layer is less than or equal to 1 $\mu$m.

10. The composite of claim 1, wherein:
the second layer is a dielectric spacer layer comprised of at least one of $MgF_2$, $BaF_2$, and $Al_2O_3$.

11. The composite of claim 1, wherein:
the first layer is formed of a material having an optical reflectivity that is greater than 90% for light having a wavelength of greater than or equal to 8 $\mu$m and less than or equal to 13 $\mu$m.

12. The composite of claim 1, wherein:
the third layer is patterned into a plurality of resonators.

13. The composite of claim 12, wherein:
the plurality of resonators include a first resonator and a second resonator, and
a width of the first resonator along a first direction is greater than a width of the second resonator along the first direction.

14. The composite of claim 1, wherein:
an emissive contrast of the composite between a low-temperature state that reflects light in the infrared (IR) range and a high-temperature state that emits light in the IR range is greater than 50%.

15. The composite of claim 1, further comprising:
a structure defining an environment; and
a surface of the structure, wherein the surface is coated with a coating comprising the first, second, and third layers, and a temperature of the environment is maintained wherein,
in response to a temperature of the phase change material being greater than the transition temperature, the coating is configured to radiate light in the infrared spectrum, and
in response to the temperature of the phase change material being less than the transition temperature, the coating is configured not to radiate light in the infrared spectrum.

16. The composite of claim 1, wherein:
the second layer includes at least one element in common with the first layer.

17. A method for manufacturing a composite, the method comprising:
providing a second layer on a first layer, the second layer comprising a material that is lattice-matched to a lattice of the first layer; and depositing a third layer on the second layer, wherein:

the third layer constitutes a phase change material characterized by a transition temperature, and the phase change material includes a dopant.

18. The method for manufacturing the composite of claim 17, further comprising patterning the third layer to form a plurality of resonators.

19. The method for manufacturing the composite of claim 17, wherein the transition temperature of the phase change material decreases as the concentration of the dopant in the phase change material increases.

20. The method for manufacturing the composite of claim 17, wherein:

the third layer is deposited by magnetron sputtering followed by annealing, and the third layer is patterned by:

forming a spin coat resist on the third layer, baking the spin coat resist, performing electron beam lithography on the baked spin coat resist, and after performing the electron beam lithography, performing reactive ion etching of the third layer to form a plurality of resonators.

* * * * *